(No Model.)
O. N. GULDLIN.
OIL FEEDING APPARATUS FOR GAS GENERATORS.
No. 528,872. Patented Nov. 6, 1894.
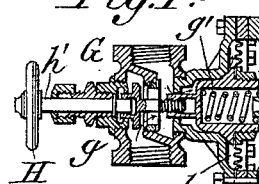
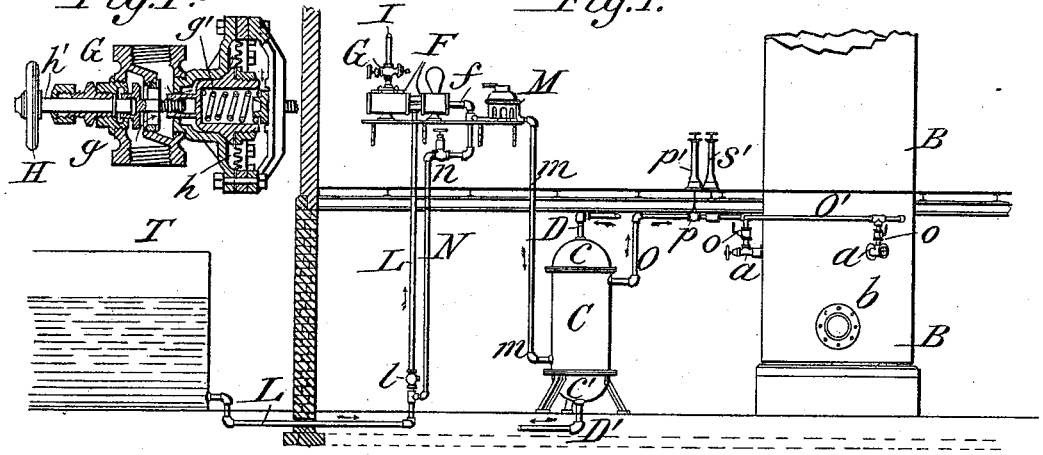
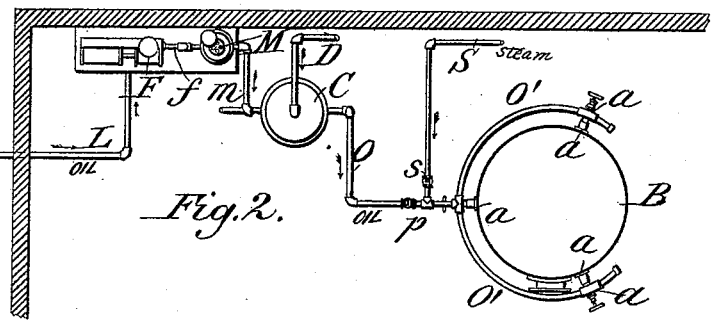
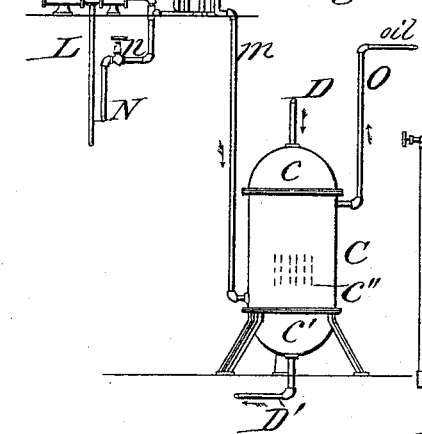
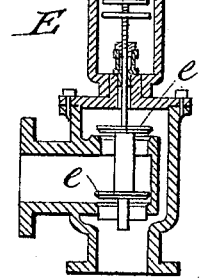
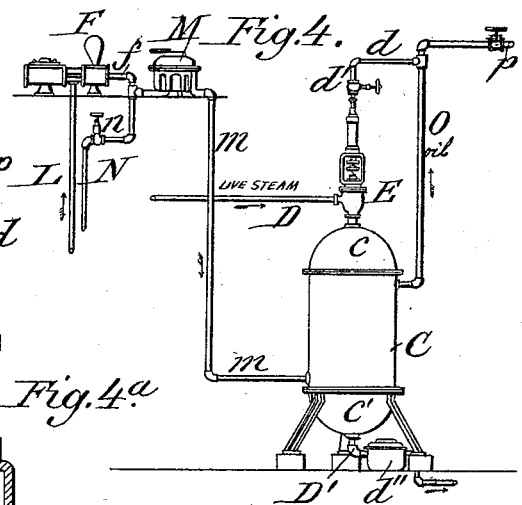
WITNESSES:
M. R. M. Fraysser
F. H. Schott
INVENTOR
Olaf N. Guldlin
BY
E. B. Clark
ATTORNEY.

UNITED STATES PATENT OFFICE.

OLAF N. GULDLIN, OF FORT WAYNE, INDIANA.

OIL-FEEDING APPARATUS FOR GAS-GENERATORS.

SPECIFICATION forming part of Letters Patent No. 528,872, dated November 6, 1894.

Application filed November 21, 1893. Serial No. 491,591. (No model.)

*To all whom it may concern:*

Be it known that I, OLAF N. GULDLIN, a citizen of the United States, residing at Fort Wayne, in the county of Allen and State of Indiana, have invented certain new and useful Improvements in Oil-Feeding Apparatus for Gas-Generators; and I do hereby declare the following to be a full, clear, and exact description of the invention, such as will enable others skilled in the art to which it appertains to make and use the same.

This invention relates to feeding hydrocarbon oil in automatically controlled and measured quantity, under substantially uniform pressure, to the superheating or other chamber of a water-gas generator.

It is now the common practice, in supplying hydrocarbon oil to the carbureting chamber or superheater of a water-gas generator, to first pump the oil from the storage tank into an oil measuring tank having a scaled index, and at the end of each "run" make a record of the oil used, as shown by the fall of the oil level in the measuring tank. The height of the oil must be recorded before starting the "run," the difference in the level being the amount of oil used. This arrangement requires two or more operations at each "run" in order to keep the record and is laborious and inaccurate. It is also the practice, in connection with the above arrangement, to inject the oil supplied to the superheater by a jet of steam. This plan was never successful, since it was wasteful of oil and the steam present deteriorated the gas by causing the production of carbonic acid and also interfered with the proper fixing of the hydrocarbon gas or vapor.

The object of my invention is to overcome these objections and difficulties in the manufacture of gas and produce greatly improved results, in the uniformity of the equality or candle power of the gas produced, the economy of oil used and the purity and permanence of the gas produced.

One of the particular objects of my invention is to supply oil or liquid hydrocarbon under uniform pressure which is automatically regulated to the requirements of the apparatus by a governor on the steam supply pipe, so that a uniform pressure is maintained on the steam piston, and, consequently, a uniform pressure maintained in the oil delivery pipe, the pump starting automatically when the pressure falls and stopping when the pressure exceeds that to which the governor valve is set.

Another object of my invention is to automatically register the quantity of oil delivered by means of a meter,—doing away with the necessity of taking records of the quantity of oil used from a measuring tank and also the necessity of intermediately filling the tank by a pump as is now the usual practice.

Another object is to provide for heating the oil, by steam and to automatically control the supply of steam to the heater by means of a governor valve by which absolute economy in the use of steam is secured and also a uniform pressure of oil or oil vapor maintained. The governor valve on the steam pipe is automatically controlled by the pressure in the oil delivery pipe, shutting off steam whenever the pressure is raised by the heat above that required and vice versa.

In connection with my apparatus, I also provide a safety relief valve in the pipe connection from the inlet of the meter to the suction pipe of the oil pump below the check valve of the latter. This provides for returning oil to the storage tank whenever a higher temperature and resultant pressure occurs in the oil heater than is desired. By means of this arrangement the meter will record oil returned by registering backward. The safety relief valve should be adjusted to open by pressure of from ten to fifteen pounds in excess of the working pressure of the oil supply.

In carrying out my invention, I preferably heat the oil by exhaust steam from the engine used in driving the blower or fan which supplies air to the generator, and in practice, such steam has been found to be not only sufficient to heat the oil to a suitable temperature, but a portion of such steam has also been used to heat feed water to the boiler.

The matter constituting my invention will be defined in the claims.

I will now particularly describe my apparatus by reference to the accompanying drawings, in which—

Figure 1 represents an elevation of the oil feeding apparatus in connection with the superheater of a water-gas apparatus. Fig. 1ᵃ represents a sectional detail of a pressure regulating valve. Fig. 2 represents a top plan view of the apparatus. Fig. 3 represents an elevation of a part of the apparatus. Fig. 4 represents an elevation of a part of the apparatus showing a governor connecting with the oil heater. Fig. 4ᵃ represents a sectional detail of the governor valve.

The superheater, B, is of that kind which is usually employed in water-gas generators and consists of an iron jacket or shell having a lining of fire brick and a filling of fire brick or tile checker work, and it has near the bottom an inlet pipe $b$, by which it connects with the generator. Not here shown. The superheater is provided internally with the carbureting compartment or chamber, and at about the top of such chamber are connected the oil atomizing injectors, $a$, arranged in the wall and having connecting with them the circular oil supply pipe O', the branch connections, of which are provided with valves, $o$. The injectors, $a$, are also provided with the usual valves, having hand wheels, as shown in Figs. 1 and 2. The oil supply pipe, O, connects the heater C, with the annular pipe, O', and is provided with an operating valve, $p$, the stem of which extends up into the floor stand pipe $p'$. A steam supply pipe S, having a valve, $s$, connects with pipe O, and the stem of said valve projects up into the floor stand $s'$, the said stands, $p'$ and $s'$, being secured to the operating floor.

The oil heater, C, preferably consists of a cylindrical casing supported in a suitable frame, and provided with upper and lower tube sheets, into which are set the tubes, $c''$, and above and below which are formed the steam boxes, $c$ and $c'$. The steam inlet pipe D, connects with the upper steam box $c$, and the drain or exhaust pipe D', connects with the lower box $c'$, and such pipe may connect at the bottom with a steam trap, $d''$, as shown in Fig. 4.

I have found that exhaust steam from the engine which is used in driving the air blower, may be successfully used to heat the oil in the heater C, and propose to use such steam for that purpose by conducting it through the tubes $c''$ of the heater. I also use live steam for heating the oil and in connection with a live steam pipe, employ a governor valve for automatically controlling the supply of steam in proportion to the pressure of vapor in the oil heater and in the oil delivery pipe, said pressure serving to automatically actuate the governor valve and shut off steam whenever the pressure is raised above that required, and vice versa. The governor valve E, connecting with steam supply pipe, D, and heater C is shown in Fig. 4. Governor valve E, is connected at the top by a pipe, $d$, having a valve, $d'$, with pipe O.

Oil is drawn from the storage tank T, by pump F, and is thence forced through meter M, into the oil heater C. The pump F, and meter M, are suitably supported on the bracket or other device and the pump connects by a pipe, L, having a check valve, $l$, with oil tank T, and also by pipe $f$, with meter M. A steam supply pipe I, connects with the steam cylinder of the pump, and is provided with a governor or reducing valve, G, which automatically maintains a uniform steam pressure on the piston, and, consequently, a fixed pressure in the oil delivery pipe $f$.

The governor valve G, (Fig. 1ᵃ) is provided internally with a valve, $g$, a coiled spring, $g'$, which tends to raise the valve from its seat, and a pressure diaphragm $h$. The hand wheel H and stem $h'$, connect with the valve for properly adjusting and setting it to the desired pressure. The delivery pressure of steam or other fluid bears upon the diaphragm $h$, tending to draw the valve, $g$, toward its seat. In opposition to this the spring tends to open the valve until there is an equilibrium established between these two forces.

It will be understood that when the tension of the spring is proportioned to the pressure bearing on the diaphragm, a constant and uniform discharge of steam is insured and, therefore, a uniform pressure exerted upon the piston of the steam cylinder, so that a constant and uniform stream or supply of oil is pumped from tank T and is registered by the meter M, as it flows into the heater C.

In case the oil becomes heated to too high a temperature and there results a higher pressure than desirable, the safety relief valve, $n$, will be opened permitting part of the oil to flow back through pipe N to the suction pipe L, below the check valve, $l$, thus relieving the excessive pressure. Under the above conditions the meter will credit the oil returned by registering backward. The safety relief valve is preferably adjusted to automatically open by a pressure of from ten to fifteen pounds in excess of the working pressure of the oil supplied to the superheater.

In order to guard against an excessive pressure in the oil heater and pipes, I provide the governor valve E, having internally suitable seats and valves, $e$; also a coiled spring connecting with the valve stem, as shown in Fig. 4ᵃ. An equalizing pipe, $d''$, connects pipe, $d$ with a part of the casing containing the coiled springs below. By means of the pipe $d$, connecting pipe O, with the top of governor E, the pressure in the oil delivery pipe actuates the valve $e$, in the governor, thereby wholly or partially shutting off the supply of steam to the heater. When the pressure falls, the valves automatically open again admitting or increasing the supply of steam to the heater. The governor valve is adjusted to close at a lower pressure than the safety relief valve, $n$, but still at a greater pressure than is required in the oil delivery pipe for properly forcing and spraying the oil through the injectors $a$, leading into the fixing chamber.

The quantity of oil delivered to the fixing chamber or other part of the gas apparatus in a given time, is regulated by the adjustable injector valves and a corresponding pressure maintained by the pump. After the valves and the pressure of the pump have once been adjusted, the operator only has to open wide the operating valve, $p$, in oil pipe O, for each gas making "run" under the ordinary working conditions. The work of the operator is thus greatly simplified, possibilities of error in records of oil are eliminated, and a uniform supply of oil is insured with resultant uniformity in the quality or candle power of the gas made. The use of my apparatus also prevents irregularities in reports by competing operators of the quantity of the oil used and at the same time affords facilities for recording the quantity of oil used during each "run" for test records or other purposes.

Having described my invention, what I claim, and desire to secure by Letters Patent, is—

1. The combination with the superheater of a gas apparatus, of an oil injector in the wall thereof, a steam heated oil heater having a steam supply pipe, an oil delivery pipe connecting the heater with the injector, a governor valve connecting the heater with said steam supply and oil delivery pipes, and means for supplying oil under pressure to the heater, substantially as described.

2. The combination with a superheater, of an oil injector, a steam heated oil heater, having steam and oil supply pipes, a meter on said oil supply pipe, means for forcing oil under pressure through the meter and heater to the injector and suitable pipe connections, substantially as described.

3. The combination with a superheater of an oil injector, an oil heater having suitable supply and delivery pipes, a meter connected in the supply pipe, a steam pump for forcing oil under pressure to the superheater, and an automatic governor valve on the steam induction pipe of said pump for maintaining a uniform pressure of oil in the delivery pipe, substantially as described.

4. The combination with the superheater having an oil injector, of an oil heater, a meter, a steam pump having an automatic governor valve, an oil tank, suitable pipe connections between said devices, a return pipe connecting the delivery pipe with the suction pipe of the pump and having a safety relief valve for automatically returning oil in case of excessive pressure in the apparatus, substantially as described.

In testimony whereof I affix my signature in presence of two witnesses.

OLAF N. GULDLIN.

Witnesses:
WM. J. LENNART,
ERNEST F. LLOYD.